United States Patent Office 2,868,834
Patented Jan. 13, 1959

2,868,834
MANUFACTURE OF NEW POLYTHIOUREAS

Robert Neher, Binningen, Switzerland, assignor to Ciba Pharmaceutical Products Inc., Summit, N. J.

No Drawing. Application January 25, 1956
Serial No. 561,341

Claims priority, application Switzerland February 1, 1955

1 Claim. (Cl. 260—506)

This invention relates to a new series of organic compounds. More particularly, this invention is concerned with polythioureas of high molecular weight having the formula (—R—NH—CS—NH—)$_n$ wherein R represents a residue of the formula —Ar— or —Ar—Z—Ar— substituted by a sulpho group. R may be bound to a thiourea group or to a free amino group; that is, a terminal R group, if any, is bound to a free amino group. Salts of these compounds are also included within the scope of this invention. The symbol —Ar— represents a phenylene residue, especially a phenylene-(1,4) residue, which may contain further substituents, such as methyl groups or additional free or esterified sulpho groups. Z represents a divalent lower hydrocarbon radical preferably —C≡C—, —CH=CH—, —CH$_2$—CH$_2$—; or an —NH—, —S—, or —S—S— group. In the given formula $n$ is a number such that the molecular weight is greater than 1000, preferably within the range $10^3$ to $10^6$. The same compound may contain identical or different R radicals.

The invention also provides mixtures of the aforesaid poly-thioureas having different molecular weights.

Valuable are polythioureas of the above formula, in which R represents residue:

and of which the molecular weight is within the range of $10^3$ to $10^6$, or mixtures of such compounds having different values for $n$, and salts thereof. Attention may be drawn to the mixture of polythioureas of the above formula described in Example 1 (infra), in which R represents the residue:

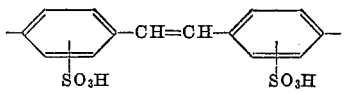

in which any terminal stilbene disulphonic acid residue is bound to a free amino group, and which mixture begins to decompose at temperatures above 300° C. and salts thereof.

The new compounds possess valuable pharmacological properties. Thus, they possess a pronounced anti-virus action. In a concentration of 10$^{-6}$ (g./kg.) they check the growth of influenza virus or New Castle disease virus in incubated chicken embryos. When administered to laboratory animals (for example, rabbits) they cause a distinct change in the tissue and in the blood such as to reduce sensitivity for virus.

The new compounds may be made by reacting a diamine of the formula:

or

wherein R has the meaning given above, and $m$ is a number such that the molecular weight is not greater than 1000, with a compound capable of forming the thiourea grouping —NH—CS—NH— by reaction with two primary amino groups. Accordingly, an amine of the above formula may be reacted, for example, with a dihalide of thiocarbonic acid, such as thiophosgene, advantageously, in an aqueous medium, especially an acid medium, and, if desired, with the aid of heat.

Instead of using the free amines as starting materials, there may be used compounds which react like free amines under the reaction conditions. Sulphonic acids may be used in the form of their metal salts. It is also possible to subject different diamines simultaneously to the aforesaid reaction, so that mixed compounds or mixtures are formed. As starting materials there are advantageously used those which lead to the formation of the compounds stated above to be especially valuable.

The reactions may be carried out in the absence or presence of a diluent and/or a catalyst and/or a condensing agent, at the ordinary or a raised temperature, in an open or closed vessel under pressure.

When mixtures of polythioureas are obtained they can be split up into their components by known methods, for example, physical processes. However, it may be of advantage to use the mixtures as such, since they may possess an improved action due to synergistic effects.

Depending on the procedure used the new compounds are obtained in the form of their free sulphonic acids or their salts. Salts may be converted in the usual manner into the free acids, and, on the other hand, the corresponding salts can be obtained from the free acids in known manner by reaction with bases, such as metal hydroxides or carbonates, for example, alkali metal or alkaline earth metal hydroxides or ammonia.

The new compounds can be used as medicaments, for example, in the form of pharmaceutical preparations which contain the compound or a salt thereof in admixture with a pharmaceutical organic or inorganic carrier suitable for enteral, parenteral or topical administration. For making the carrier there are used substances which do not react with the new compounds, for example, water, gelatine, lactose, starches, magnesium stearate, talc, vegetable oils, benzyl alcohols, gums, polyalkylene glycols, Vaseline, cholesterol or other known carriers for medicaments. The pharmaceutical preparations may be made up, for example, as tablets, dragees, salves, creams or in liquid form as solutions, suspensions or emulsions. If desired, they may be sterilized and/or may contain auxiliary substances such as preserving agents, stabilizing agents, wetting or emulsifying agents, salts for regulating the osmotic pressure or buffers. They may also contain other therapeutically valuable substances, for example, antibacterial substances or anti-virus substances.

The following example illustrates the invention:

Example 1

70 grams of 4,4'-diaminostilbene-2,2'-disulphonic acid are dissolved in 800 cc. of water with the addition of 170 cc. of a 2 N-solution of caustic soda, the filtered solution is mixed with a solution of 160 grams of sodium acetate in 800 cc. of water, and 40 grams of thiophosgene in 360 cc. of acetone are introduced dropwise in the course of 1½ hours, while stirring or vibrating the mixture. The reaction is maintained for a further 5 hours, during which a precipitate separates and the pH value falls to 5. A diazo-test portion is strongly changed with respect to the starting material. The reaction mixture is acidified with 100 cc. of concentrated hydrochloric acid, whereupon dissolution becomes complete and then the whole is mixed with 1800 cc. of a saturated solution of sodium chloride. The precipitate formed is separated by centrifuging and dried at 90° C. The product so obtained, after being freed from salts and impurities by dialysis against water, corresponds to a mixture of polythioureas of the formula

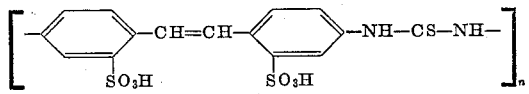

in which any terminal stilbene disulphonic acid residue is bound to a free amino group, and the product is a red-brown powder which begins to decompose at temperatures above 300° C. It dissolves well in water both in the form of the free acid and also in the form of its alkali metal salts, and especially in the form of the ammonium salt.

What is claimed is:

A member of the group consisting of polythioureas, mixtures and salts thereof, represented by the formula:

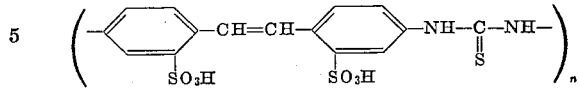

wherein $n$ represents a whole number such that the molecular weight is within the range from about $10^3$ to about $10^6$, and in which any terminal phenyl radical is bound to a free amino group.

References Cited in the file of this patent
UNITED STATES PATENTS

| | | |
|---|---|---|
| 1,218,656 | Thomaschewski | Mar. 13, 1917 |
| 2,172,856 | Simons | Sept. 12, 1939 |